United States Patent
Ejiri et al.

(10) Patent No.: US 6,798,924 B2
(45) Date of Patent: Sep. 28, 2004

(54) SYSTEM AND METHOD FOR DISPLAYING AN IMAGE INDICATING A POSITIONAL RELATION BETWEEN PARTIALLY OVERLAPPING IMAGES

(75) Inventors: Koichi Ejiri, Chiba (JP); Shin Aoki, Kanagawa (JP); Takashi Saitoh, Kanagawa (JP); Guan Haike, Kanagawa (JP); Takuji Sakamoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 20 days.

(21) Appl. No.: 10/232,516

(22) Filed: Sep. 3, 2002

(65) Prior Publication Data

US 2003/0002750 A1 Jan. 2, 2003

Related U.S. Application Data

(62) Division of application No. 09/150,288, filed on Sep. 9, 1998, now Pat. No. 6,466,701.

(51) Int. Cl.[7] .................................................. G06K 9/36
(52) U.S. Cl. ........................ 382/284; 382/282; 382/294; 358/450; 358/453; 348/36; 348/50
(58) Field of Search ................................. 382/151, 216, 382/218, 219, 282, 284, 291, 293, 294, 295; 358/448, 450, 453; 348/36, 39, 49, 50; 396/326, 332

(56) References Cited

U.S. PATENT DOCUMENTS

| | | | | |
|---|---|---|---|---|
| 4,541,010 A | * | 9/1985 | Alston | 348/283 |
| 5,133,020 A | * | 7/1992 | Giger et al. | 382/128 |
| 5,140,647 A | * | 8/1992 | Ise et al. | 382/41 |
| 5,659,823 A | * | 8/1997 | Mukai et al. | 396/291 |
| 5,682,198 A | * | 10/1997 | Katyayama et al. | 348/445 |
| 5,721,624 A | * | 2/1998 | Kumashiro et al. | 358/450 |
| 5,825,044 A | * | 10/1998 | Allen et al. | 250/557 |
| 5,845,166 A | * | 12/1998 | Fellegara et al. | 396/429 |
| 5,940,641 A | * | 8/1999 | McIntyre et al. | 396/332 |
| 5,963,664 A | * | 10/1999 | Kumar et al. | 382/154 |
| 5,978,016 A | * | 11/1999 | Lourette et al. | 348/64 |
| 5,982,941 A | * | 11/1999 | Loveridge et al. | 382/260 |
| 5,982,951 A | * | 11/1999 | Katayama et al. | 382/284 |
| 6,074,111 A | * | 6/2000 | Kasahara | 400/76 |
| 6,229,565 B1 | * | 5/2001 | Bobry | 348/207.99 |

FOREIGN PATENT DOCUMENTS

| | | |
|---|---|---|
| JP | 57-017273 | 1/1982 |
| JP | 05-037856 | 2/1993 |
| JP | 5-161050 | 6/1993 |
| JP | 08-018857 | 1/1996 |
| JP | 8-4783 | 2/1996 |
| JP | 09-116799 | 5/1997 |
| JP | 9-266561 | 10/1997 |

* cited by examiner

Primary Examiner—Bhavesh M. Mehta
Assistant Examiner—Yosef Kassa
(74) Attorney, Agent, or Firm—Oblon, Spivak, McClelland, Maier & Neustadt, P.C.

(57) ABSTRACT

A camera system includes a display monitor which displays an image of an object, taken by an optical unit, on a screen of the monitor. A reading unit reads a preceding image and a current image among a plurality of partially overlapping images, from a memory device, the preceding image and the current image containing a common element. A determining unit determines a positional relation between the preceding image and the current image based on a common pattern derived from the common element in the two adjacent images read by the reading unit. A displaying unit displays an image indicating a boundary of the preceding image on the screen of the monitor at a shifted position according to the positional relation determined by the determining unit, with the current image concurrently displayed on the screen of the monitor.

56 Claims, 8 Drawing Sheets

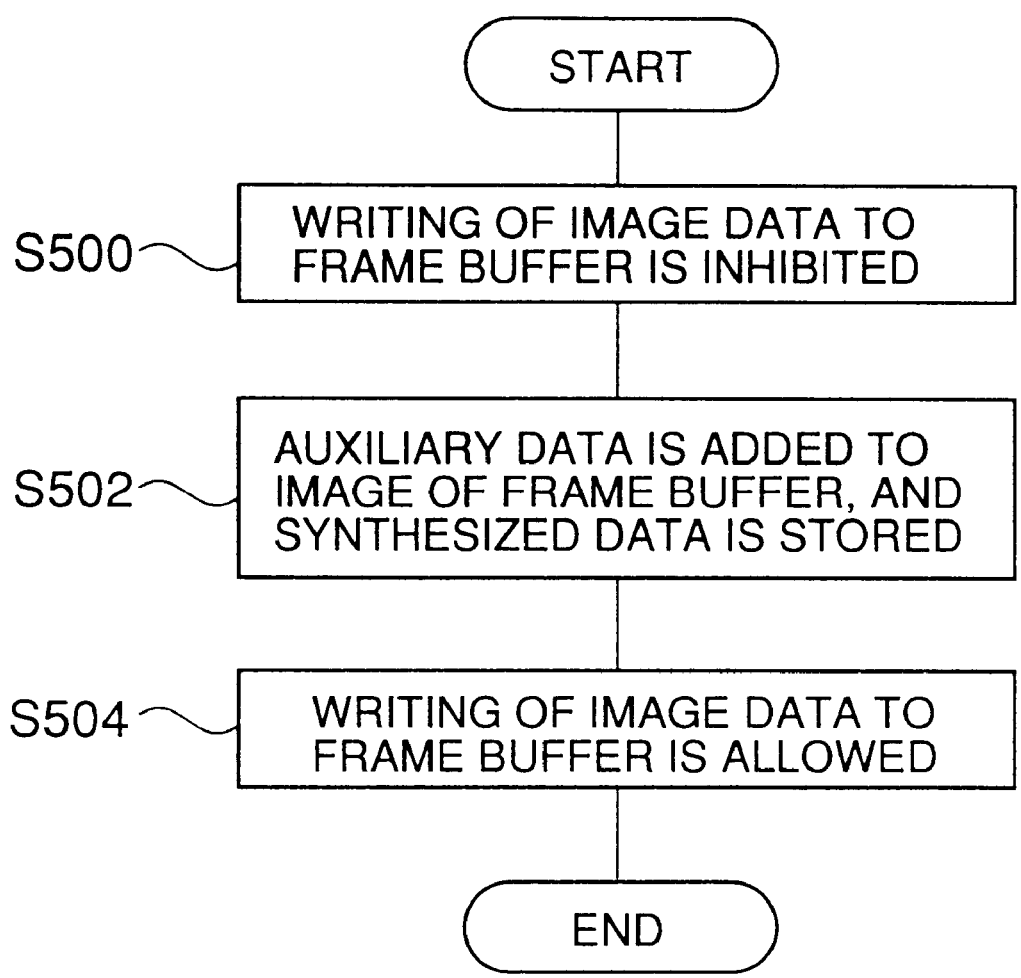

PRECEDING IMAGE    CURRENT IMAGE

PRECEDING IMAGE

CURRENT IMAGE

SYSTEM AND METHOD FOR DISPLAYING AN IMAGE INDICATING A POSITIONAL RELATION BETWEEN PARTIALLY OVERLAPPING IMAGES

This application is a divisional of application Ser. No. 09/150,288, filed Sep. 9, 1998, now U.S. Pat No. 6,466,701.

BACKGROUND OF THE INVENTION

1. Field of the Invention

The present invention relates to a camera system which electronically stores an image of an object and displays the image on a display monitor.

2. Description of the Related Art

Generally, to achieve an adequately high level of resolution of an image captured by using a digital camera or a video camera, it is necessary to use a zoom-up function of the camera or move the camera close to an object to be imaged. This makes it difficult to obtain an image covering a wide angle related to the object. To capture an image covering a wide angle related to the object, it is necessary to use a zoom-down function of the camera or move the camera away from the object. However, this makes it difficult to obtain an image with a high level of resolution.

In order to obtain a wide-angle image with a high resolution from an object, a divisional shooting method has been proposed. In the divisional shooting method, a plurality of partially overlapping images are successively shot so as to cover a wide angle related to the object, and they are synthesized to create a composite image with an adequate level of resolution.

As disclosed in Japanese Published Utility Model Application No. 8-4783, an image processing device which is capable of combining a plurality of partially overlapping images together to create a composite image is known.

To effectively carry out the divisional shooting method, it is necessary that, after a preceding image is taken and before a current image is taken, the user stop movement of an optical axis of the camera at an appropriate position where an overlapping portion of the two adjacent images is appropriate for subsequently producing a composite image from the images. However, in order to meet this requirement, a conventional digital camera requires a special adapter. If such an adapter is not used, it is difficult for the conventional digital camera to effectively carry out the divisional shooting method. In a case of the conventional digital camera with no special adapter, there is a possibility that no overlapping portion exists between the two adjacent images or a too large overlapping portion be produced between the two adjacent images. If the overlapping images with undesired overlapping portions are obtained through the divisional shooting method, it is difficult to effectively combine or synthesize the images together to create a composite image.

SUMMARY OF THE INVENTION

An object of the present invention is to provide a camera system which displays an image indicating a positional relation among partially overlapping images, and enables an operator to easily and effectively carry out a divisional shooting process.

Another object of the present invention is to provide a divisional shooting method which displays an image indicating a positional relation among partially overlapping images on a screen of a monitor during a divisional shooting mode of a camera system.

The above-mentioned objects of the present invention are achieved by a camera system which comprises: a display monitor which displays an image of an object, taken by an optical unit, on a screen of the monitor; a reading unit which reads a preceding image and a current image among a plurality of partially overlapping images, from a memory device, the preceding image and the current image containing a common element; a determining unit which determines a positional relation between the preceding image and the current image based on a common pattern derived from the common element in the two adjacent images read by the reading unit; and a displaying unit which displays an image indicating a boundary of the preceding image on the screen of the monitor at a shifted position according to the positional relation determined by the determining unit, with the current image concurrently displayed on the screen of the monitor.

The above-mentioned objects of the present invention are achieved by a divisional shooting method for a camera system in which at least two of partially overlapping images of an object, taken by an optical unit, are displayed, comprising the steps of: reading a preceding image and a current image among the partially overlapping images, from a memory device, the preceding image and the current image containing a common element; determining a positional relation between the preceding image and the current image based on a common pattern derived from the common element in the two adjacent images; and displaying an image, indicating a boundary of the preceding image, on a screen of a display monitor at a shifted position according to the positional relation determined by the determining step, with the current image concurrently displayed on the screen of the monitor.

In the camera system of the present invention, a positional relation between the preceding image and the current image is determined based on a common pattern derived from the common element in the two adjacent images. The operator can easily carry out a divisional shooting mode of the camera system by viewing both the current image and the image indicating the positional relation between the partially overlapping images on the screen of the monitor. The positional relation between the preceding image and the current image is clearly noticeable to the operator by viewing the positional relation image on the screen of the monitor together with the current image while the camera is panned in a desired direction. Therefore, the operator easily stops the movement of the optical axis of the camera at an appropriate position by viewing the positional relation image on the screen of the monitor, and turns ON a shutter switch to store the current image.

BRIEF DESCRIPTION OF THE DRAWINGS

Other objects, features and advantages of the present invention will become more apparent from the following detailed description when read in conjunction with the accompanying drawings in which:

FIG. 7 is a flowchart for explaining an image storage process performed by the processor of the camera system when a shutter switch is turned ON.

DETAILED DESCRIPTION OF THE PREFERRED EMBODIMENTS

A description will now be given of the preferred embodiments of the present invention with reference to the accompanying drawings.

In order to carry out a divisional shooting process, the present invention utilizes a method and a system for determining a positional relation between partially overlapping images based upon a common pattern in an overlapping portion of the images. The method and the system are disclosed, for example, in U.S. patent application Ser. No. 08/807,571 filed on Feb. 27, 1997 and U.S. patent application Ser. No. 08/966,889 filed on Nov. 10, 1997, both assigned to the applicant of the present application. The contents of these co-pending applications are hereby incorporated by reference.

Figure 1:
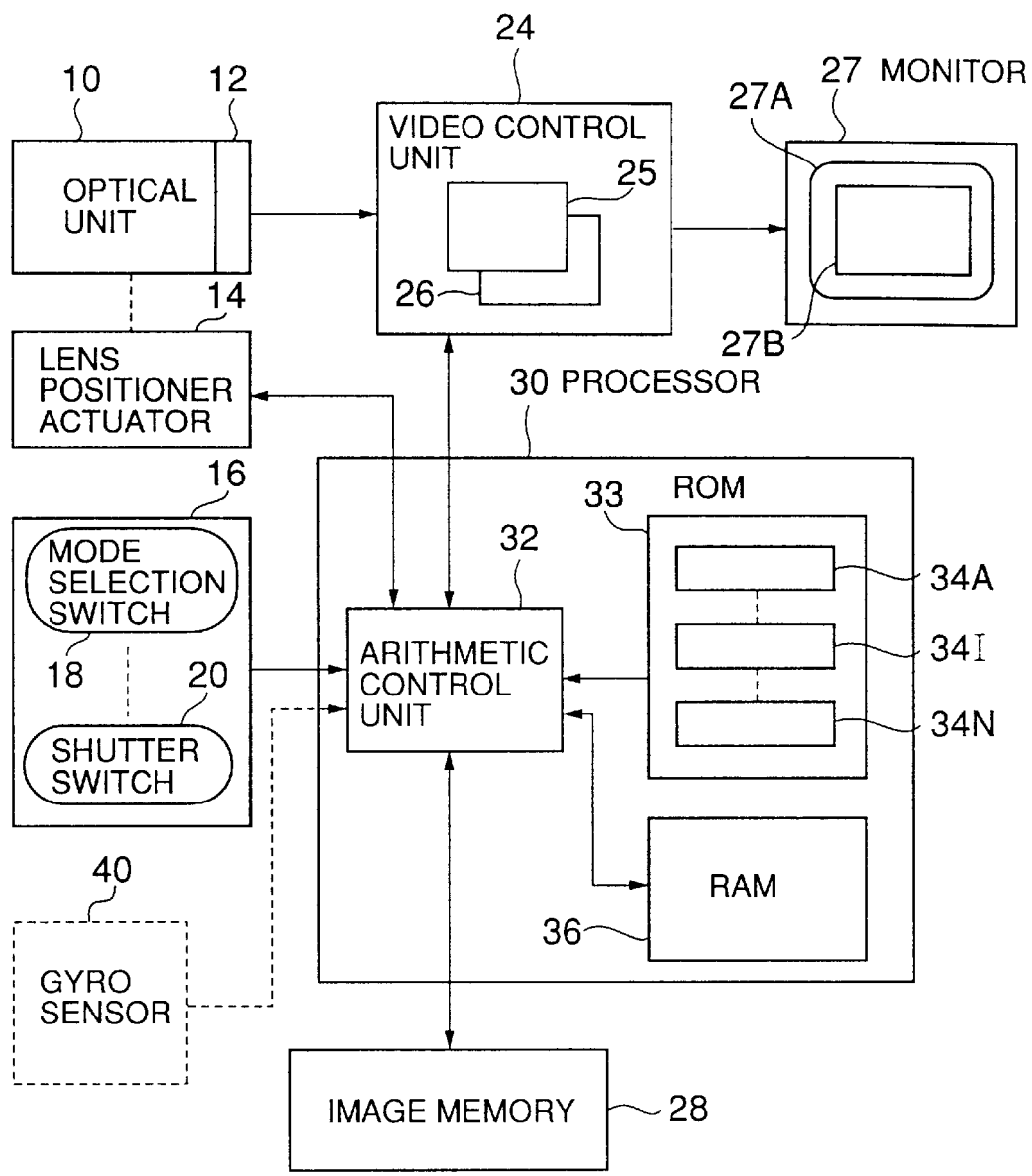
FIG. 1 is a block diagram of a preferred embodiment of a camera system of the present invention.

FIG. 1 shows a preferred embodiment of a camera system of the present invention. One example of the camera system of the present invention is a digital camera.

As shown in FIG. 1, the camera system of the present embodiment includes an optical unit 10. The optical unit 10 has an image pickup device 12, a lens (not shown), and a lens positioner (not shown). The image pickup device 12 is comprised of a charge-coupled device (CCD). The image pickup device 12 converts light incident from an object into an electrical signal, or an image signal indicative of an input image of the object or the scene. The lens positioner mechanically positions the lens of the optical unit 10 at a desired distance from the object along an optical axis of the lens. Hereinafter, the lens of the optical unit 10 will be referred to as the camera.

In the camera system of the present embodiment, a lens positioner actuator 14 actuates the lens positioner of the optical unit 10 so that the lens is positioned at a desired distance from the object along the optical axis of the lens. An operation part 16 is an operation part of the camera system of FIG. 1, which includes a mode selection switch 18, a shutter switch 20, and other control switches (not shown). An operator can manipulate one of such switches of the operation part 16 so as to select one of operational modes of the camera system or to release the shutter of the camera system.

In the camera system of the present embodiment, a video control unit 24 converts the signal from the image pickup device 12 into a digital signal, processes the digital signal to produce a frame of the input image, and stores the frame in a frame buffer 25. The frame or image defined in the frame buffer 25 is a pixel map that has an array of pixel data, each indicating an intensity (and/or a color value) for a position of a corresponding one of the picture elements, or pixels, in the image. The video control unit 24 displays the image defined in the frame buffer 25 on a liquid-crystal display (LCD) monitor 27, accessing the frame buffer 25 as frequently as a scan rate of the monitor 27. The monitor 27 has a display screen 27A, and the image defined in the frame buffer 25 is displayed on the screen 27A of the monitor 27 by the video control unit 24.

The video control unit 24 further includes a frame buffer 26 in addition to the frame buffer 25. The frame buffer 26 stores auxiliary data indicative of a peripheral boundary 27B (which will be described later) corresponding to the image defined in the frame buffer 25. The video control unit 24 displays the peripheral boundary 27B, indicated by the auxiliary data defined in the frame buffer 26, on the screen 27A of the monitor 27, accessing the frame buffer 26 at the same time as the frame buffer 25. Hence, the image defined in the frame buffer 25 and the auxiliary data defined in the frame buffer 26 are synthesized so that the image with the peripheral boundary 27B is displayed on the screen 27A of the monitor 27 in an overlaid manner. The auxiliary data defined in the frame buffer 26 includes a frame number to identify a captured image among a plurality of partially overlapping images, which will be described later. Further, the auxiliary data may further include image data of a displacement vector or a direction of the optical axis of the camera, which will be described later.

In the camera system of the present embodiment, an image memory 28 is a storage device which stores an image captured by the video control unit 24. The image memory 28 may be any image storage device, for example, one of semiconductor memories including flash memories, or one of magnetic disks including floppy disks and mini-disks (MD).

In the camera system of the present embodiment, a processor 30 controls the overall operation of the camera system and carries out a divisional shooting process including determination of a positional relation between partially overlapping images based upon a common pattern in an overlapping portion of the images. The processor 30 includes an arithmetic control unit 32, a read-only memory (ROM) 33, and a random access memory (RAM) 36. The ROM 33 stores a number of programs 34A through 34N, and fixed information, such as character fonts. The arithmetic control unit 32 carries out individual control operations for the elements of the camera system when one of the programs 34A through 34N in the ROM 33 is executed by the processor 30. The RAM 36 is a main memory of the processor 30 which is available to any of the programs when it is executed. The RAM 36 serves as a work memory available to the arithmetic control unit 32. Further, the processor 30 includes a power supply circuit (not shown) which supplies power to the camera system, and an interface (not shown) which connects the camera system with an external host computer.

In the camera system of FIG. 1, the operator can select one of the operational modes by using the mode selection switch 18. In the present embodiment, the operational modes of the camera system include a normal shooting mode and a divisional shooting mode.

When the normal shooting mode is selected by the mode selection switch 18, a single image of an object or a scene is captured through the image pickup device 12, the image displayed on the screen 27A of the monitor 27 is viewed, and the shutter switch 20 is turned ON by the operator so that the image defined in the frame memory 25 is stored in the image memory 28.

When the divisional shooting mode is selected in the camera system of the present embodiment, a plurality of partially overlapping images are successively shot so as to cover a wide angle related to an object to be imaged, and they are synthesized to create a composite image with an adequate level of resolution. The divisional shooting mode is useful to obtain a panoramic image or a high-resolution image through image composition. The camera system of the present invention is particularly relevant to the divisional shooting mode, and the following description will be given of an operation of the camera system of the present embodiment when the divisional shooting mode is performed.

In the camera system of the present embodiment, when the divisional shooting mode is selected by the mode selection switch 18, the processor 30 starts the execution of a divisional shooting processing program 34I among the programs 34A through 34N in the ROM 33. A divisional shooting process is performed by the processor 30 according to the divisional shooting processing program 34I.

In order to take a first one of partially overlapping images when the divisional shooting process is started, the operator directs the optical axis of the camera (or the lens of the optical unit 10) to an object to be imaged. In accordance with the signal from the image pickup device 12, the video control unit 24 stores a corresponding frame in the frame memory 25, and displays the image on the screen 27A of the monitor 27. The operator turns ON the shutter switch 20 of the operation part 16 while viewing the image on the screen 27A of the monitor 27. A shutter signal from the operation part 16 is sent to the processor 30 immediately after the shutter switch 20 is turned ON. In response to the shutter signal, the processor 30 stores the image, defined in the frame memory 25 of the video control unit 24, in the image memory 28.

The above-mentioned image storage process is performed by the processor 30 of the camera system in accordance with an image storage processing program 34N among the programs 34A through 34N stored in the ROM 33. The execution of the image storage processing program 34N is started by the processor 30 in response to the shutter signal. During the image storage process, all the image data corresponding to the entire screen 27A of the monitor 27 is not stored in the image memory 28, but only a portion of the image data corresponding to an internal portion of the screen 27A of the monitor 27 within the peripheral boundary 27B is stored in the image memory 28. The processor 30 adds a frame number to the auxiliary data of the frame buffer 26 and stores such data defined in the frame buffer 26, in the image memory 28, together with the image defined in the frame buffer 25, during the image storage process. The data being stored in the image memory 28 may be compressed in a compact form or may not be compressed in the original form. During the image storage process, the writing of image data to the frame buffer 25 is inhibited and the image displayed on the screen 27A of the monitor 27 is fixed. Before the image storage process ends, the writing of image data to the frame buffer 25 is allowed. Hence, after the image storage process is performed, the image defined in the frame buffer 25 can be variably updated according to the movement of the optical axis of the camera, and the resulting image is displayed on the screen 27A of the monitor 27.

FIG. 7 shows an image storage process performed by the processor 30 of the camera system of the present embodiment. The image storage processing program 34N among the programs 34A through 34N in the ROM 33 is loaded to the RAM 36 and executed by the processor 30 immediately after the shutter switch 20 is turned ON by the operator. Then, the image storage process of FIG. 7 is performed by the processor 30 according to the image storage processing program 34N.

As shown in FIG. 7, at the start of the image storage process, the processor 30 at step S500 inhibits the writing of image data to the frame buffer 25 by the video control unit 24. Hence, during the image storage process, the image displayed on the screen 27A of the monitor 27 is fixed.

The processor 30 at step S502 combines the auxiliary data of the frame buffer 26 with the image of the frame buffer 25 to create a synthesized image, and stores the synthesized image in the image memory 28. As described above, the auxiliary data of the frame buffer 26 includes a frame number to identify a captured image among the partially overlapping images. The auxiliary data of the frame buffer 26 may include other parameter values (which will be described later). However, when the image storage process with respect to a first one of partially overlapping images is performed, the auxiliary data of the frame buffer 26 is null or vacant, and only the image of the frame buffer 25 is stored in the image memory 28 at the step S502.

The processor 30 at step S504 allows the writing of image data to the frame buffer 25 by the video control unit 24. After the step S504 is performed, the image storage process of FIG. 7 ends. Hence, after the image storage process is performed, the image defined in the frame buffer 25 is displayed on the screen 27A of the monitor 27.

After the first one of the partially overlapping images is taken, the operator pans the camera in a desired direction in order to take a following one of the partially overlapping images during the divisional shooting mode. By viewing the preceding image with the peripheral boundary on the screen 27A of the monitor 27, the operator stops the movement of the optical axis of the camera at an appropriate position where an overlapping portion of the two adjacent images is appropriate for subsequently producing a composite image from the images. Then, the current image is captured and stored in the image memory 28 in a similar manner. The above-described procedure is repeated until all the partially overlapping images for the object to be imaged are captured and stored. In this manner, the partially overlapping images are successively shot so as to cover a wide angle related to the object, and they are synthesized to create a composite image with an adequate level of resolution by using the technology as disclosed in the above-mentioned U.S. patent applications.

According to the camera system of the present invention, the operator can easily carry out the divisional shooting process by viewing both the current image and the peripheral boundary 27B (or the preceding image) on the screen 27A of the monitor 27. A positional relation between the preceding image and the current image is clearly noticeable to the operator by viewing the peripheral boundary 27B on the screen 27A of the monitor 27 and the current image while the camera is panned in the desired direction. Therefore, the operator easily stops the movement of the optical axis of the camera at an appropriate position by viewing an image of the peripheral boundary 27B, and turns ON the shutter switch 20 to store the current image.

Figure 2:
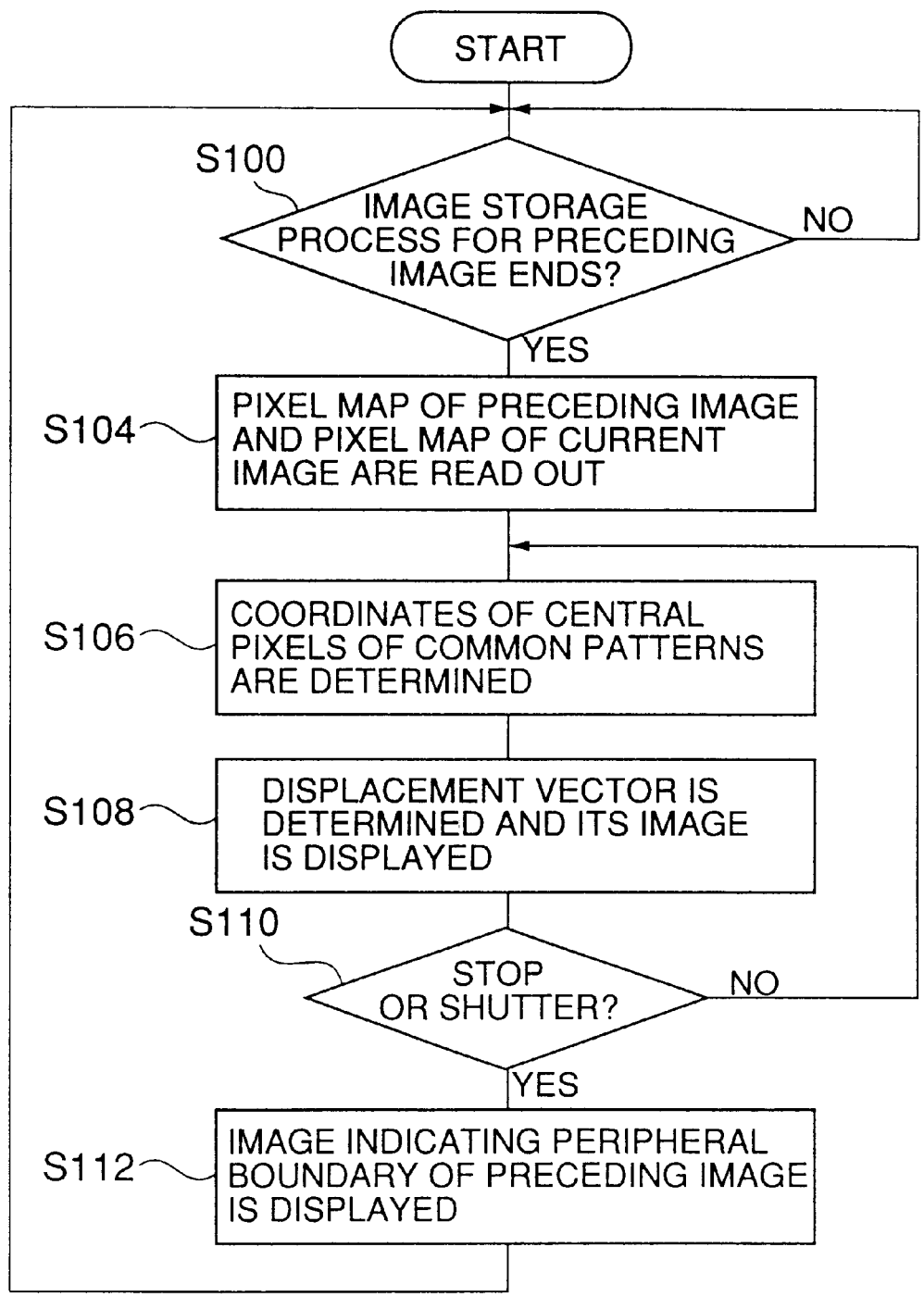
FIG. 2 is a flowchart for explaining a first example of a divisional shooting process performed by a processor of the camera system.

FIG. 2 shows a first example of the divisional shooting process performed by the processor 30 in accordance with the divisional shooting processing program 34I.

As shown in FIG. 2, at the start of the divisional shooting process, the processor 30 at step S100 detects whether the image storage process, shown in FIG. 7, with respect to a preceding one of the partially overlapping images ends. The end of the image storage process is notified to the arithmetic control unit 32 when the execution of the image storage processing program 34N has normally ended. When the result at the step S100 is negative, the processor 30 repeats the step S100.

When the result at the step S100 is affirmative, the processor 30 at step S104 reads out the pixel map of the preceding image from the image memory 28, and reads out the pixel map of a currently-captured image from the frame buffer 25. These pixel maps are temporarily stored in the RAM 36. The pixel map of the preceding image is selected as a standard image. Each of the pixel data of the two adjacent images corresponding to an overlapping portion of the images is divided into blocks of a predetermined size, for example, 16 by 16 pixels.

After the step S104 is performed, the processor 30 at step S106 performs a matching between corresponding blocks from an overlapping portion of the two adjacent images. During the step S106, a common pattern in the two adjacent images is identified if a certain similarity threshold is met. This matching may be performed by checking the intensities of individual pixels of the corresponding blocks. This is useful for reducing the amount of required calculations. Alternatively, the matching may be performed by checking the color values of individual pixels of the corresponding blocks, but this will increase the amount of required calculations. The above matching procedures are repeated until all the blocks are processed so that a maximum-similarity common pattern in the preceding image and the maximum-similarity common pattern in the current image are detected.

A method and a system for determining a positional relation between partially overlapping images based upon a common pattern in an overlapping portion of the images are disclosed in the above-mentioned U.S. patent applications, and the divisional shooting process according to the present invention utilizes the method and the system.

As previously described, during the step S106 of the divisional shooting process of FIG. 2, a determination of a positional relation between partially overlapping images is carried out. By referring to FIG. 8A and FIG. 8B, a detailed procedure of the determination of the positional relation in the step S106 will now be described.

It is supposed that the pixel map of the preceding image from the image memory 28 and the pixel map of the current image from the frame buffer 25 have been read out as in the step S104. These pixel maps are temporarily stored in the RAM 36. The pixel map of the preceding image is selected as the standard image. Each of the two adjacent images corresponding to an overlapping portion of the images is divided into blocks of a predetermined size.

Figure 8A:
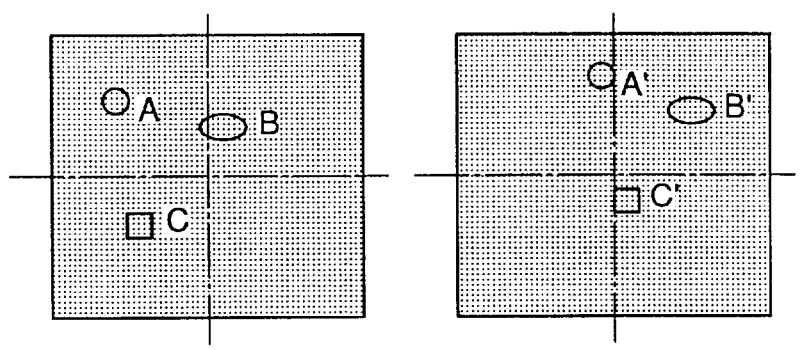
FIG. 8A and FIG. 8B are diagrams for explaining a determination of a positional relation between partially overlapping images in the divisional shooting process according to the present invention.

As shown in FIG. 8A, pixels "A", "B" and "C" in the preceding image and pixels "A'", "B'" and "C'" in the current image correspond to the overlapping portion of the images. During the step S106, a matching between corresponding blocks from the overlapping portion of the two adjacent images is performed. A common pattern (such as the pixels A, B and C and the pixels A', B' and C') in the two adjacent images is identified if a certain similarity threshold is met. This matching may be performed by checking the intensities of individual pixels of the corresponding blocks. The above matching procedures are repeated until all the blocks are processed, so that a maximum-similarity common pattern in the preceding image and the maximum-similarity common pattern in the current image are detected.

Figure 8B:
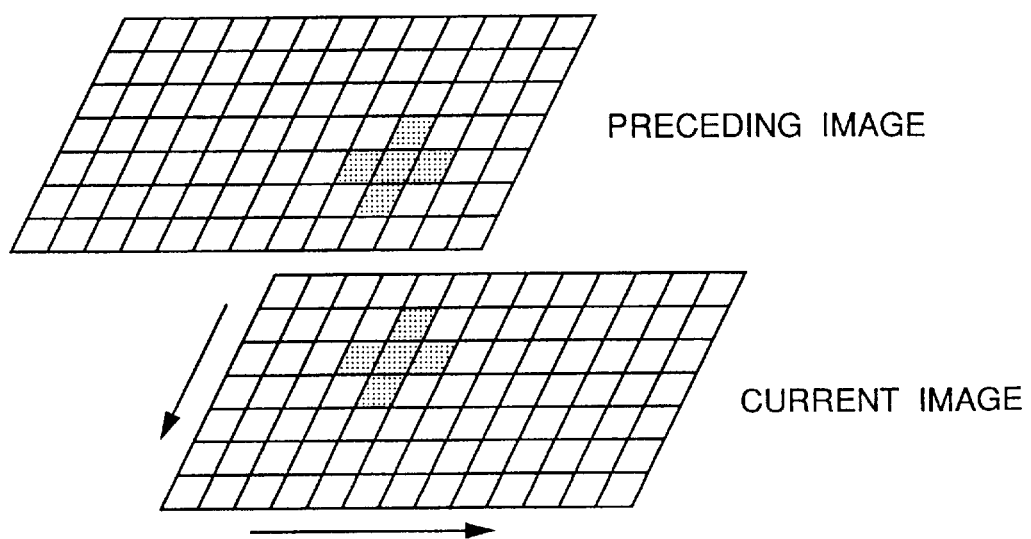

As shown in FIG. 8B, the maximum-similarity common pattern in the two images is detected if the difference between the pixel values (or the intensities of the pixels A and A', the pixels B and B' or the pixels C and C') of the corresponding blocks is found to be the minimum when the current image is moved relative to the preceding image by both a distance for a first number of pixels in the x-axis direction and a distance for a second number of pixels in the y-axis direction. Through the above pixel-based method, the processor 30 detects the maximum-similarity common pattern in the two images. That is, the processor 30 at the step S106 carries out the determination of the positional relation between the partially overlapping images.

In the above-described procedure, the maximum-similarity common pattern in the two images is detected by using the pixel-based method, in order to carry out the determination of the positional relation between the partially overlapping images. However, according to the present invention, it is also possible to achieve the determination of a positional relation between partially overlapping images at an accuracy higher than the accuracy of one pixel. As previously described, the determination of a positional relation between partially overlapping images based upon a common pattern in an overlapping portion of the images are disclosed in the above-mentioned U.S. patent applications, and, for that purpose, the divisional shooting process according to the present invention may utilize the method and the system.

Referring back to FIG. 2, during the step S106, the processor 30 further determines both coordinates (I, J) of a central pixel of the maximum-similarity common pattern in the preceding image and coordinates (Im, Jm) of a central pixel of the maximum-similarity common pattern in the current image. The coordinates (I, J) and the coordinates (Im, Jm) based on a screen coordinate system of the screen 27A of the monitor 27 are determined by the processor 30.

The processor 30 at step S108 determines a displacement vector (I-Im, J-Jm), which indicates a positional relation between the preceding image and the current image, by the difference between the coordinates (I, J) and the coordinates (Im, Jm). In the step S108, after the contents of the frame buffer 26 are cleared, the processor 30 writes image data, indicative of the displacement vector, to the frame buffer 26 as part of the auxiliary data. Hence, the image of the displacement vector (or the auxiliary data defined in the frame buffer 26) is displayed on the screen 27A of the monitor 27.

The processor 30 at step S110 detects whether the operator stops the movement of the optical axis of the camera (or detects whether the operator turns ON the shutter switch 20). When the result at the step S110 is negative, the above steps S106 and S108 are repeated.

When the step S106 is performed for second or subsequent ones of the partially overlapping images, the coordinates (I, J) of the central pixel of the maximum-similarity common pattern in the preceding image and the direction of the displacement vector are known. The matching procedures in the step S106 may be performed for only the blocks of the current image in the overlapping portion of the two images, indicated by the direction of the displacement vector and the coordinates (I, J). By using such a simplified matching, the common pattern in the two adjacent images may be identified, and coordinates (Im, Jm) of the central pixel of the maximum-similarity common pattern in the current image may be determined.

The operator stops the panning of the camera at an appropriate position where an appropriate overlapping portion of the two adjacent images can be seen with the image of the displacement vector on the screen 27A of the monitor 27, and turns ON the shutter switch 20 to store the current image. Every time the steps S106 and S108 are performed, the processor 30 compares the currently obtained displacement vector and the previously obtained displacement vector (stored in an internal register of the processor 30 or the RAM 36) so as to determine whether the operator stops the movement of the optical axis of the camera. If the difference between the two displacement vectors is larger than a threshold value, the result at the step S110 is negative. If the difference between the two displacement vectors is less than the threshold value, the result at the step S110 is affirmative.

When the result at the step S110 is affirmative, the processor 30 at step S112 writes image data, indicative of the peripheral boundary 27B of the preceding image, to the frame buffer 26 at a position shifted from the previous position. The shifted position is determined from the previous position based on the magnitude and direction of the displacement vector obtained in the step S108. Hence, the image of the peripheral boundary 27B defined in the frame buffer 26 is displayed on the screen 27A of the monitor 27 as if the peripheral boundary 27B is shifted according to the movement of the optical axis of the camera.

In the step S112, the image data of the displacement vector obtained in the step S108 may be left in the frame buffer 26 without change. Alternatively, the image data of the displacement vector in the frame buffer 26 may be deleted, and then the image data of the shifted peripheral boundary 27B may be defined in the frame buffer 26. The image of the peripheral boundary 27B being displayed on the screen 27A of the monitor 27 may be a frame of the preceding image or a solid model of the preceding image with a certain color attached to the internal pixels.

The operator can easily carry out the divisional shooting process with the camera system by viewing both the current image and the peripheral boundary 27B (or the preceding image) on the screen 27A of the monitor 27. A positional relation between the preceding image and the current image is clearly noticeable to the operator by viewing the peripheral boundary 27B on the screen 27A of the monitor 27 and the current image while the camera is panned in a desired direction. Therefore, the operator easily stops the movement of the optical axis of the camera at an appropriate position by viewing an image of the peripheral boundary 27A, and turns ON the shutter switch 20 to store the current image.

After the step S112 is performed, the control is transferred to the step S100. The processor 30 at the step S100 waits for the end of the image storage process at which the currently captured image is further stored in the image memory 28. As described above, during the image storage process, the frame number for the current image and the displacement vector for the current image are added to the auxiliary data of the frame buffer 26 and such data defined in the frame buffer 26 is stored in the image memory 28 together with the image defined in the frame buffer 25. The frame number and the displacement data are used when synthesizing the partially overlapping images to create a composite image.

Figure 3A:
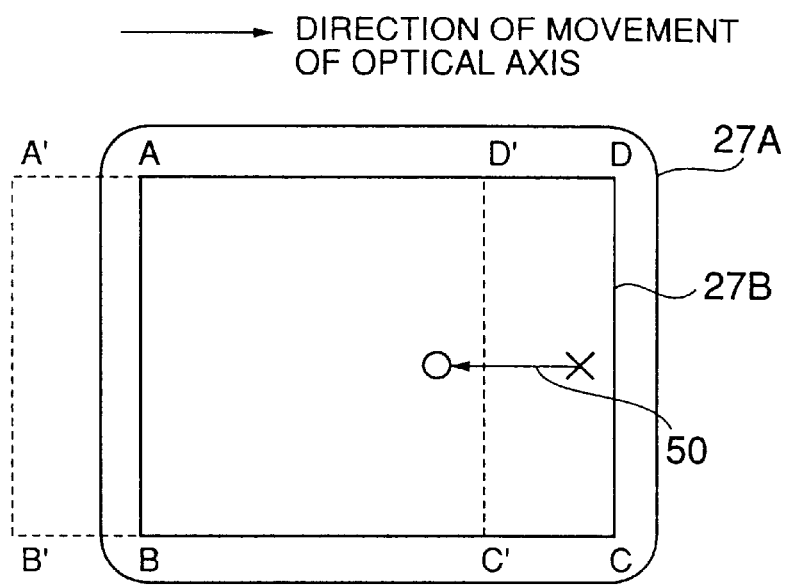
FIG. 3A and FIG. 3B are diagrams showing an image which is displayed on a screen of a display monitor when the camera is moved in a given direction.

FIG. 3A shows an image which is displayed on the screen 27A of the monitor 27 when the camera is being moved in a given direction indicated in FIG. 3A. In FIG. 3A, a peripheral boundary of a preceding image is indicated by the dotted-line rectangle A'B'C'D', and a peripheral boundary of a current image is indicated by the solid-line rectangle ABCD. A displacement between the preceding image and the current image proportional to the movement of the optical axis of the camera is defined by the displacement vector. In the case of FIG. 3A, the displacement vector is directed to the left and has a length proportional to the movement of the optical axis of the camera. An image 50 of the displacement vector is displaced on the screen 27A of the monitor 27 as indicated in FIG. 3A. Although the contents of the preceding image are not displayed, the operator can easily notice a positional relation between the preceding image and the current image on the screen 27A of the monitor 27 with the image 50.

Figure 3B:
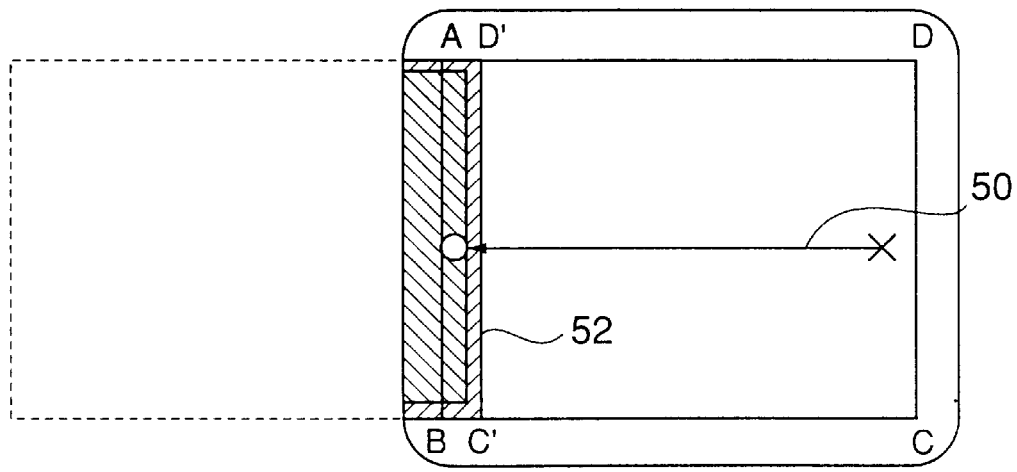

FIG. 3B shows an image which is displayed on the screen 27A of the monitor 27 when the movement of the optical axis of the camera is stopped and the shutter switch 20 is turned ON by the operator. In FIG. 3B, an image 52 of the peripheral boundary 27B, which is displayed on the screen 27A of the monitor 27, is indicated by the rectangle ABC'D'. The rectangle ABC'D' corresponds to an overlapping portion of the two adjacent images. As described above, the image data, indicative of the peripheral boundary 27B of the preceding image, is written to the frame buffer 26 at positions shifted from the previous positions according to the movement of the optical axis of the camera. The image 50 of the displacement vector corresponding to the magnitude and direction of the displacement vector is displayed on the screen 27A of the monitor 27. The operator can clearly notice an appropriate overlapping portion of the two images by the image 50 of the displacement vector and the image 52 of the peripheral boundary 27B. The image 50 of the displacement vector, at the time the movement of the optical axis of the camera is stopped, may be displayed on the screen 27A of the monitor 27. Alternatively, the display of the image 50 of the displacement vector may be omitted.

Figure 4:
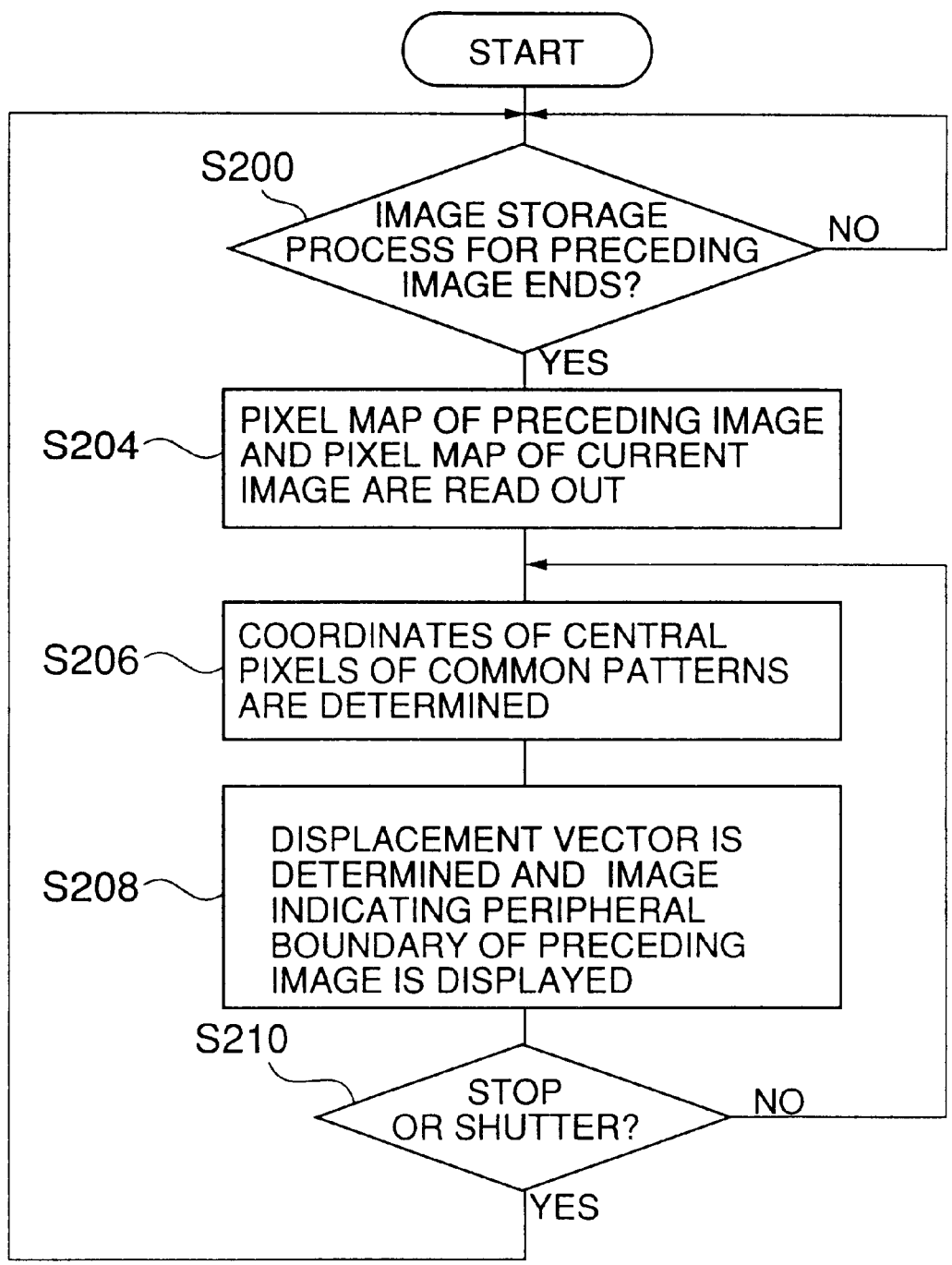
FIG. 4 is a flowchart for explaining a second example of the divisional shooting process performed by the processor of the camera system.

FIG. 4 shows a second example of the divisional shooting process performed by the processor 30 in accordance with the divisional shooting processing program 34I.

As shown in FIG. 4, at the start of the divisional shooting process in the present embodiment, the processor 30 at step S200 detects whether the image storage process with respect to a preceding one of the partially overlapping images ends. The end of the image storage process is notified to the arithmetic control unit 32 when the execution of the image storage processing program 34N has normally ended. When the result at the step S200 is negative, the processor 30 repeats the step S200.

When the result at the step S200 is affirmative, the processor 30 at step S204 reads out the pixel map of the preceding image from the image memory 28, and reads out the pixel map of the currently-captured image from the frame buffer 25. The pixel maps are temporarily stored in the RAM 36. The pixel map of the preceding image is selected as a standard image. Each of the pixel data of the two adjacent images corresponding to the overlapping portion of the images is divided into blocks of a predetermined size, for example, 16 by 16 pixels.

After the step S204 is performed, the processor 30 at step S206 performs a matching between corresponding blocks from the two adjacent images. During the step S206, a common pattern in the two adjacent images is identified if a certain similarity threshold is met. The matching procedures are repeated for every block until all the blocks are processed so that the common pattern in the preceding image and the common pattern in the current image are identified.

Further, during the step S206, the processor 30 determines both coordinates (I, J) of a central pixel of a maximum-similarity common pattern in the preceding image and coordinates (Im, Jm) of a central pixel of the maximum-similarity common pattern in the current image. The coordinates (I, J) and the coordinates (Im, Jm) based on a screen coordinate system of the screen 27A of the monitor 27 are determined by the processor 30.

The steps S200–S206 in the present embodiment are essentially the same as the steps S100–S106 in the embodiment of FIG. 2.

The processor at step S208 determines a displacement vector (I-Im, J-Jm), which indicates a positional relation between the preceding image and the current image, by the difference between the coordinates (I, J) and the coordinates (Im, Jm). In the present embodiment, during the step S208, the processor 30 writes image data, indicative of the peripheral boundary 27B of the preceding image, to the frame buffer 26 at positions shifted from the previous positions. The shifted positions are indicated by the magnitude and direction of the displacement vector. Hence, the image of the peripheral boundary 27B defined in the frame buffer 26 is displayed on the screen 27A of the monitor 27.

Unlike the embodiment of FIG. 2, during the step S208 in the present embodiment, the processor 30 does not write the image data of the displacement vector to the frame buffer 26 as part of the auxiliary data. Hence, the image of the displacement vector is not displayed on the screen 27A of the monitor 27.

The processor 30 at step S210 detects whether the operator stops the movement of the optical axis of the camera (or detects whether the operator turns ON the shutter switch 20). When the result at the step S210 is negative, the above steps S206 and S208 are repeated.

The operator stops the panning of the camera at an appropriate position where an appropriate overlapping portion of the two adjacent images can be seen with the image of the displacement vector on the screen 27A of the monitor 27, and turns ON the shutter switch 20 to store the current image. Every time the steps S206 and S208 are performed, the processor 30 compares the currently obtained displacement vector and the previously obtained displacement vector (stored in the internal register or the RAM 36) so as to determine whether the operator stops the panning of the camera. If the difference between the two displacement vectors is larger than a threshold value, the result at the step S210 is negative. If the difference between the two displacement vectors is less than the threshold value, the result at the step S210 is affirmative.

When the result at the step S210 is affirmative, the control is transferred to the step S200. The processor 30 at the step S200 waits for the end of the image storage process at which the currently captured image is further stored in the image memory 28.

In the present embodiment, the operator can view a peripheral boundary image indicating a positional relation between the current image and the preceding image before the movement of the optical axis of the camera-is stopped or the shutter switch 20 is turned ON. The operator can easily carry out the divisional shooting process with the camera system, but the current image and the peripheral boundary image are always displayed on the screen 27A of the monitor 27. It is desirable that the intensity and/or color of the peripheral boundary image may be set at a suitable value so as to prevent the peripheral boundary image from hindering the check for the current image on the screen 27A of the monitor 27.

Figure 5:
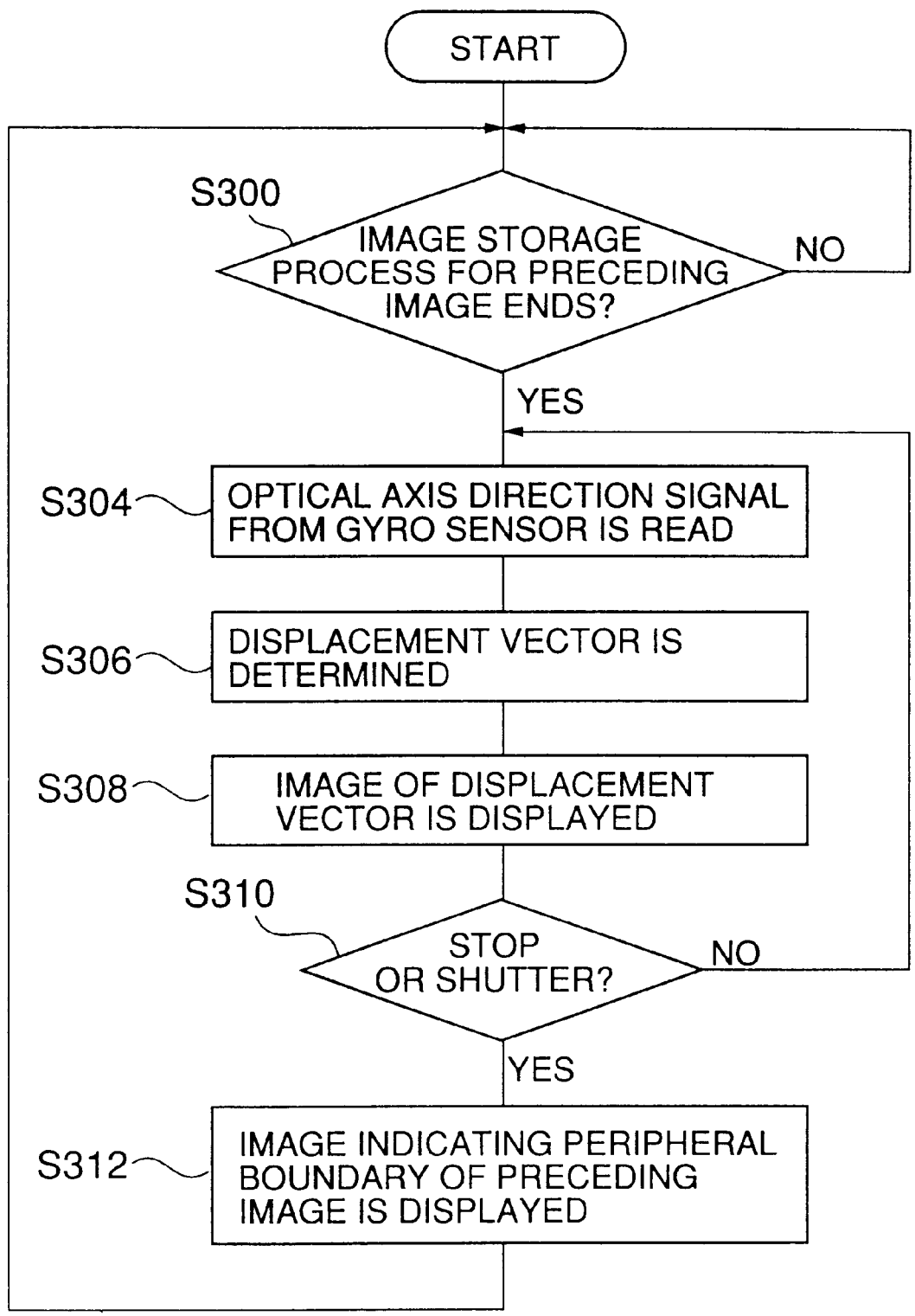
FIG. 5 is a flowchart for explaining a third example of the divisional shooting process performed by the processor of the camera system.

FIG. 5 shows a third example of the divisional shooting process performed by the processor 30 in accordance with the divisional shooting processing program 34I.

In the present embodiment, the camera system further includes a three-dimensional gyro sensor 40 connected to the arithmetic control unit 32 of the processor 30 as indicated by the dotted line in FIG. 1. The sensor 40 detects a three-dimensional direction of the optical axis of the optical unit 10 and outputs a signal indicating the optical axis direction to the arithmetic control unit 32 of the processor 30. The sensor 40 may be a built-in type or an external-installation type for the camera system. Other elements of the camera system in the present embodiment are the same as corresponding elements of the camera system shown in FIG. 1, and a description thereof will be omitted.

When the divisional shooting mode is selected by the mode selection switch 18, the processor 30 starts the execution of the divisional shooting processing program 34I in the ROM 33. The present embodiment of the divisional shooting process is performed by the processor 30 according to the divisional shooting processing program 34I.

In order to take a first one of partially overlapping images at the start of the divisional shooting process is started, the operator directs the optical axis of the camera to an object to be imaged and turns ON the shutter switch 20. A shutter signal from the operation part 16 is sent to the processor 30 immediately after the shutter switch 20 is turned ON. In response to the shutter signal, the processor 30 reads a signal output by the sensor 40 at that time, and temporarily stores the signal in an internal register of the processor 30 or the RAM 36. In accordance with the signal from the image pickup device 12, the video control unit 24 stores a corresponding frame in the frame memory 25, and displays the image on the screen 27A of the monitor 27. In response to the shutter signal, the processor 30 stores the image, defined in the frame memory 25, in the image memory 28.

The above-mentioned image storage process is performed by the processor 30 according to the image storage processing program 34N in the ROM 33. The execution of the image storage processing program 34N is started by the processor 30 in response to the shutter signal. During the image storage process, the processor 30 adds both the frame number and the optical axis direction signal to the auxiliary data of the frame buffer 26, and stores such data defined in the frame buffer 26, in the image memory 28, together with the image defined in the frame buffer 25. During the image storage process, the writing of image data to the frame buffer 25 is inhibited and the image displayed on the screen 27A of the monitor 27 is fixed. Before the image storage process ends, the writing of image data to the frame buffer 25 is allowed. Hence, after the image storage process is performed, the image defined in the frame buffer 25 can be variably updated according to the movement of the optical axis of the camera, and the resulting image is displayed on the screen 27A of the monitor 27.

After the first one of the partially overlapping images is taken, the operator pans the camera in a desired direction in order to take a following one of the partially overlapping images during the divisional shooting mode. By viewing the preceding image with the peripheral boundary on the screen 27A of the monitor 27, the operator stops the movement of the optical axis of the camera such that the preceding image and the currently-captured image overlap each other with an appropriate overlapping portion of the images. Then, the current image is captured and stored in the image memory 28 together with the auxiliary data, including the frame number and the optical axis direction signal, in a similar manner. The above-described procedure is repeated until all the partially overlapping images for the object to be imaged are captured and stored.

With reference to FIG. 5, a description will now be given of the third example of the divisional shooting process performed by the processor 30.

As shown in FIG. 5, at the start of the divisional shooting process in the present embodiment, the processor 30 at step S300 detects whether the image storage process of FIG. 7 with respect to a preceding one of the partially overlapping images ends. The end of the image storage process is notified to the processor 30. When the result at the step S300 is negative, the processor 30 repeats the step S300.

When the result at the step S300 is affirmative, the processor 30 at step S304 reads an optical axis direction signal (related to the current image) output by the sensor 40 at that time, and reads the optical axis direction signal (related to the preceding image) from the internal register or the RAM 36.

After the step S304 is performed, the processor 30 at step S306 determines a displacement vector, which indicates a positional relation of the preceding image to the current image on the screen 27A of the monitor 27, by the difference between the optical axis direction signal related to the preceding image and the optical axis direction signal related to the current image.

The processor 30 at step S308 writes image data, indicative of the displacement vector, to the frame buffer 26 as part of the auxiliary data after the contents of the frame buffer 26 are cleared. Hence, an image of the displacement vector (or the auxiliary data defined in the frame buffer 26) is displayed on the screen 27A of the monitor 27, similar to the image 50 shown in FIG. 3A and FIG. 3B.

The processor 30 at step S310 detects whether the operator stops the movement of the optical axis of the camera (or detects whether the operator turns ON the shutter switch 20). When the result at the step S310 is negative, the above steps S304 through S308 are repeated.

The operator stops the panning of the camera at an appropriate position where an appropriate overlapping portion of the two adjacent images can be seen with the image of the displacement vector on the screen 27A of the monitor 27, and turns ON the shutter switch 20 to store the current image. Every time the steps S304 through S308 are performed, the processor 30 compares the currently obtained displacement vector and the previously obtained displacement vector (stored in the internal register or the RAM 36) so as to determine whether the operator stops the movement of the optical axis of the camera. If the difference between the two displacement vectors is larger than a threshold value, the result at the step S310 is negative. If the difference between the two displacement vectors is less than the threshold value, the result at the step S310 is affirmative.

When the result at the step S310 is affirmative, the processor 30 at step S312 writes image data, indicative of the peripheral boundary 27B of the preceding image, to the frame buffer 26 at positions shifted from the previous positions. The shifted positions are indicated by the magnitude and direction of the displacement vector obtained in the step S306. Hence, the image of the peripheral boundary 27B defined in the frame buffer 26 is displayed on the screen 27A of the monitor 27.

In the step S312, the image data of the displacement vector obtained in the step S306 may be left in the frame buffer 26 without change. Alternatively, the image data of the displacement vector in the frame buffer 26 may be deleted, and then the image data of the shifted peripheral boundary 27B may be defined in the frame buffer 26. The image of the peripheral boundary 27B being displayed on the screen 27A of the monitor 27 may be a frame of the preceding image or a solid model of the preceding image with a certain color attached to the internal pixels.

The operator can easily carry out the divisional shooting process with the camera system by viewing both the current image and the peripheral boundary 27B (or the preceding image) on the screen 27A of the monitor 27. A positional relation between the preceding image and the current image is clearly noticeable to the operator by viewing the peripheral boundary 27B on the screen 27A of the monitor 27 and the current image while the camera is panned in a desired direction. Therefore, the operator easily stops the movement of the optical axis of the camera at an appropriate position by viewing an image of the peripheral boundary 27B, and turns ON the shutter switch 20 to store the current image.

After the step S312 is performed, the control is transferred to the step S300. The processor 30 at the step S300 waits for the end of the image storage process at which the currently captured image is further stored in the image memory 28. As described above, during the image storage process, the frame number for the current image and the displacement vector for the current image are added to the auxiliary data of the frame buffer 26 and such data defined in the frame buffer 26 is stored in the image memory 28 together with the image defined in the frame buffer 25. The frame number and the displacement data are used when synthesizing the partially overlapping images to create a composite image.

Figure 6:
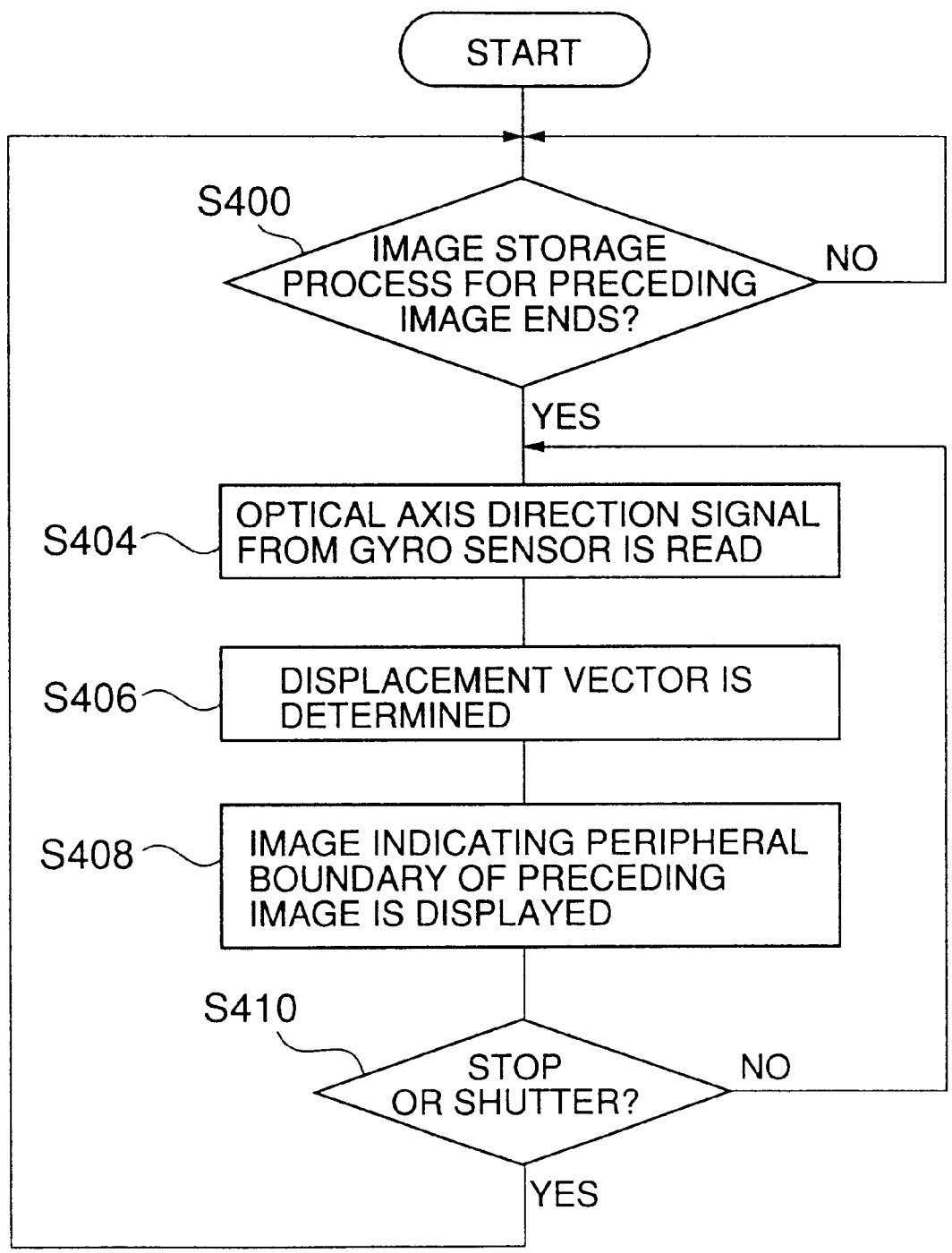
FIG. 6 is a flowchart for explaining a fourth example of the divisional shooting process performed by the processor of the camera system.

FIG. 6 shows a fourth example of the divisional shooting process performed by the processor 30 in accordance with a divisional shooting processing program 34I.

As shown in FIG. 6, at the start of the divisional shooting process in the present embodiment, the processor 30 at step S400 detects whether the image storage process of FIG. 7 with respect to a preceding one of the partially overlapping images ends. The end of the image storage process is notified to the processor 30. When the result at the step S400 is negative, the processor 30 repeats the step S400.

When the result at the step S400 is affirmative, the processor 30 at step S404 reads an optical axis direction signal (related to the current image) output by the sensor 40 at that time, and reads the optical axis direction signal (related to the preceding image) from the internal register or the RAM 36.

After the step S404 is performed, the processor 30 at step S406 determines a displacement vector, which indicates a positional relation of the preceding image to the current image on the screen 27A of the monitor 27, by the difference between the optical axis direction signal related to the preceding image and the optical axis direction signal related to the current image.

The processor 30 at step S408 writes image data, indicative of the peripheral boundary 27B of the preceding image, to the frame buffer 26 at positions shifted from the previous positions. The shifted positions are indicated by the magnitude and direction of the displacement vector obtained in the step S406. Hence, an image of the peripheral boundary 27B defined in the frame buffer 26 is displayed on the screen 27A of the monitor 27, similar to the image 52 shown in FIG. 3B.

The processor 30 at step S410 detects whether the operator stops the movement of the optical axis of the camera (or detects whether the operator turns ON the shutter switch 20). When the result at the step S410 is negative, the above steps S404 through S408 are repeated.

The operator stops the panning of the camera at an appropriate position where an appropriate overlapping portion of the two adjacent images can be seen with the image of the peripheral boundary 27B on the screen 27A of the monitor 27, and turns ON the shutter switch 20 to store the current image. Every time the steps S404 through S408 are performed, the processor 30 compares the currently obtained displacement vector and the previously obtained displacement vector (stored in the internal register or the RAM 36)

so as to determine whether the operator stops the movement of the optical axis of the camera. If the difference between the two displacement vectors is larger than a threshold value, the result at the step S410 is negative. If the difference between the two displacement vectors is less than the threshold value, the result at the step S410 is affirmative.

The operator can easily carry out the divisional shooting process with the camera system by viewing both the current image and the peripheral boundary 27B (or the preceding image) on the screen 27A of the monitor 27. A positional relation between the preceding image and the current image is clearly noticeable to the operator by viewing the peripheral boundary 27B on the screen 27A of the monitor 27 and the current image while the camera is panned in a desired direction. Therefore, the operator easily stops the movement of the optical axis of the camera at an appropriate position by viewing the image of the peripheral boundary 27B, and turns ON the shutter switch 20 to store the current image.

When the result at the step S410 is affirmative, the control is transferred to the step S400. The processor 30 at the step S400 waits for the end of the image storage process at which the currently captured image is further stored in the image memory 28.

The above-described embodiments of the present invention are applied to a digital camera. However, the present invention is not limited to the above-described embodiments. It is readily understood that the present invention is essentially applicable to a still-video camera and other camera systems which electronically store an image of an object and display the image on a display monitor. Further, variations and modifications of the above-described embodiments may be made without departing from the scope of the present invention.

The present invention is based on Japanese priority application No. 9-245522, filed on Sep. 10, 1997, the entire contents of which are hereby incorporated by reference.

What is claimed is:

1. A camera comprising:
a display monitor configured to display on a screen of the display monitor at least one of a current image and a preceding image taken by an optical unit;
a storage unit configured to store the preceding image; and
a control unit configured to display a part of the preceding image on the screen when the current image is displayed on the screen, the displayed part of the preceding image indicating a relation between the current image and the preceding image at a shifted position,
wherein the current image is taken by referring to the displayed part of the preceding image on the screen.

2. A camera comprising:
a display monitor configured to display on a screen of the display monitor at least one of a current image and a preceding image taken by an optical unit;
a storage unit configured to store the preceding image; and
a control unit configured to display a part of the preceding image on the screen when the current image is displayed on the screen, the displayed part of the preceding image indicating a common boundary portion between the current image and the preceding image at a shifted position,
wherein the current image is taken at a position at which a portion of the current image and the displayed part of the preceding image are overlapped and displayed on the screen of the display monitor.

3. The camera of claim 2, further comprising:
a determining unit configured to determine a positional relation between the preceding image and the current image based on a common part in the preceding image and the current image.

4. The camera of claim 3, wherein the display monitor is configured to display a displacement vector, which corresponds to the positional relation between the preceding image and the current image, during movement of an optical axis of the optical unit.

5. The camera of claim 3, wherein the determining unit is configured to perform a matching between corresponding blocks taken from an overlapping portion of the preceding image and the current image, so that a maximum-similarity common part in the preceding image and the current image is identified.

6. The camera of claim 3, wherein the determining unit is configured to perform a matching between corresponding blocks taken from an overlapping portion of the preceding image and the current image by checking intensities of individual pixels of the corresponding blocks.

7. The camera of claim 3, wherein the determining unit is configured to determine both coordinates of a central pixel of a maximum-similarity common part in the preceding image and coordinates of a central pixel of the maximum similarity common part in the current image.

8. The camera of claim 3, wherein the determining unit is configured to determine a displacement vector, which indicates a positional relation between the preceding image and the current image, based on a difference between coordinates of a central pixel of a maximum-similarity common part in the preceding image and coordinates of a central pixel of the maximum-similarity common part in the current image, and wherein the displaying unit is configured to display an image of the displacement vector on the display monitor with the current image concurrently displayed on the display monitor.

9. The camera of claim 3, further comprising:
a sensor configured to output an optical axis direction signal indicating a direction of an optical axis of the optical unit; and
a secondary determining unit configured to determine a positional relation between the preceding image and the current image based on a difference between the optical axis direction signal output by the sensor with respect to the current image and the optical axis direction signal output by the sensor with respect to the preceding image.

10. A camera system comprising:
a display monitor configured to display on a screen of the display monitor at least one of a current image and a preceding image taken by an optical unit;
a determining unit configured to determine a positional relation between the preceding image and the current image based on a common part in the preceding image and the current image;
a control unit configured to display a part of the preceding image on the screen when the current image is displayed on the screen, the displayed part of the preceding image indicating a common boundary portion between the current image and the preceding image at a shifted position,
wherein the current image is taken at a position at which a portion of the current image and the displayed part of the preceding image are overlapped and displayed on the screen of the display monitor, and an image storing unit configured to store images taken by the optical unit in an image memory, wherein the image storing unit stores auxiliary data, which contains information indicating the positional relation from the determining unit, in the image memory, in addition to the images stored therein.

11. The camera system of claim 10, wherein the display monitor is configured to display a displacement vector, corresponding to the positional relation between the preceding image and the current image, during movement of an optical axis of the optical unit.

12. The camera system of claim 10, wherein the determining unit is configured to perform a matching between corresponding blocks taken from an overlapping portion of the preceding image and the current image, so that a maximum-similarity common part in the preceding image and the current image is identified.

13. The camera system of claim 10, wherein the determining unit is configured to perform a matching between corresponding blocks taken from an overlapping portion of the preceding image and the current image by checking intensities of individual pixels of the corresponding blocks.

14. The camera system of claim 10, wherein the determining unit is configured to determine both coordinates of a central pixel of a maximum-similarity common part in the preceding image and coordinates of a central pixel of the maximum-similarity common part in the current image.

15. The camera system of claim 10, wherein the determining unit is configured to determine a displacement vector, which indicates a positional relation between the preceding image and the current image, based on a difference between coordinates of a central pixel of a maximum-similarity common part in the preceding image and coordinates of a central pixel of the maximum-similarity common part in the current image, and wherein the displaying unit is configured to display an image of the displacement vector on the display monitor with the current image concurrently displayed on the display monitor.

16. A camera system comprising:
  a display monitor configured to display on a screen of the display monitor at least one of a current image and a preceding image taken by an optical unit;
  a determining unit configured to determine a relation between the preceding image and the current image based on a common part in the preceding image and the current image;
  a control unit configured to display a part of the preceding image on the screen when the current image is displayed on the screen, the displayed part of the preceding image indicating a common boundary portion between the current image and the preceding image at a shifted position,
  wherein the current image is taken at a position at which a portion of the current image and the displayed part of the preceding image are overlapped and displayed on the screen of the display monitor;
  a sensor configured to output an optical axis direction signal indicating a direction of an optical axis of the optical unit;
  a secondary determining unit configured to determine a positional relation between the preceding image and the current image based on a difference between the optical axis direction signal output by the sensor with respect to the current image and the optical axis direction signal output by the sensor with respect to the preceding image; and an image storing unit configured to store an image of the object taken by the optical unit in an image memory, wherein the image storing unit stores auxiliary data, which contains information indicating the positional relation from the secondary determining unit, in the image memory, in addition to the image stored therein.

17. The camera system of claim 16, wherein the display monitor is configured to display a displacement vector, which corresponds to the positional relation between the preceding image and the current image, during movement of an optical axis of the optical unit.

18. The camera system of claim 16, wherein the determining unit is configured to perform a matching between corresponding blocks taken from an overlapping portion of the preceding image and the current image, so that a maximum-similarity common part in the preceding image and the current image is identified.

19. The camera system of claim 16, wherein the determining unit is configured to perform a matching between corresponding blocks taken from an overlapping portion of the preceding image and the current image by checking intensities of individual pixels of the corresponding blocks.

20. The camera system of claim 16, wherein the determining unit is configured to determine both coordinates of a central pixel of a maximum-similarity common part in the preceding image and coordinates of a central pixel of the maximum-similarity common part in the current image.

21. The camera system of claim 16, wherein the determining unit is configured to determine a displacement vector, which indicates a positional relation between the preceding image and the current image, based on a difference between coordinates of a central pixel of a maximum-similarity common part in the preceding image and coordinates of a central pixel of the maximum-similarity common part in the current image, and wherein the displaying unit is configured to display an image of the displacement vector on the display monitor with the current image concurrently displayed on the display monitor.

22. A computer program product for use with a camera system having a display monitor, an image storing unit, and an optical unit, the computer program product comprising:
  a computer storage medium; and
  a computer program code mechanism embedded in the computer storage medium for causing the camera system to display at least two partially overlapping images taken by said optical unit, wherein the at least two partially overlapping images include a preceding image and a current image, the computer program code mechanism including:
  a first computer code means for causing the display monitor to display a part of the preceding image when the display monitor displays the current image, the displayed part of the preceding image indicating a common boundary portion between a current image and the preceding image at a shifted position, wherein the current image is taken at a position at which a portion of the current image and the displayed part of the preceding image are overlapped and displayed on a screen of the display monitor; and
  further computer code means for causing the image storing unit to store the preceding image in an image memory.

23. The computer program product of claim 22, wherein the computer program code mechanism further includes:
  a second computer code means for causing a determining unit included in the camera system to determine a relation between a preceding image and a current image based on a common part in the preceding image and the current image.

24. The computer program product of claim 23, wherein the determining unit performs matching between corresponding blocks taken from an overlapping portion of the preceding image and the current image, so that a maximum-similarity common part in the preceding image and the current image is identified.

25. The computer program product of claim 23, wherein the determining unit performs matching between corresponding blocks taken from an overlapping portion of the preceding image and the current image by checking intensities of individual pixels of the corresponding blocks.

26. The computer program product of claim 23, wherein the determining unit determines both coordinates of a central pixel of a maximum similarity common part in the preceding image and coordinates of a central pixel of the maximum-similarity common part in the current image.

27. The computer program product of claim 23, wherein the computer program code mechanism further includes:
third computer code means for causing a sensor included in the camera system to output an optical axis direction signal indicating a direction of an optical axis of the optical unit; and
fourth computer code means for causing a secondary determining unit to determine a positional relation between the preceding image and the current image based on a difference between the optical axis direction signal output by the sensor with respect to the current image and the optical axis direction signal output by the sensor with respect to the preceding image.

28. The computer program product of claim 27, wherein the computer program code mechanism further includes:
sixth computer code means for causing the image storing unit to store an image of the object taken by the optical unit in the image memory, wherein auxiliary data, which contains information indicating the positional relation from the secondary determining unit, is stored in the image memory in addition to the image stored therein.

29. The computer program product of claim 23, wherein the determining unit determines a displacement vector, which indicates a positional relation between the preceding image and the current image, based on a difference between coordinates of a central pixel of a maximum-similarity common part in the preceding image and coordinates of a central pixel of the maximum-similarity common part in the current image, and the display monitor displays an image of the displacement vector with the current image concurrently displayed.

30. The computer program product of claim 23, wherein the computer program code mechanism further includes:
fifth computer code means for causing the image storing unit to store an image of the object taken by the optical unit in the image memory, wherein auxiliary data, which contains information indicating the positional relation from the determining unit, is stored in the image memory in addition to the image stored therein.

31. The computer program product of claim 23, wherein the display monitor displays a displacement vector, which corresponds to the positional relation between the preceding image and the current image, during movement of an optical axis of the optical unit.

32. The computer program product of claim 22, wherein the computer storage medium is arranged as a read-only memory.

33. The computer program product of claim 22, wherein the computer program code mechanism is arranged as a plurality of programs.

34. A method of capturing images in which a preceding image and a current image are displayed, comprising:
storing the preceding image;
displaying a part of the preceding image when the current image is displayed, the displayed part of the preceding image indicating a relation between the current image and the preceding image at a shifted position; and
capturing the current image by referring to the displayed part of the preceding image.

35. The method of claim 34, further comprising:
determining a relation between the preceding image and the current image based on a common part in the preceding image and the current image, wherein,
the displayed part of the preceding image indicates a common boundary portion between the current image and the preceding image at a shifted position, and
the current image is taken at a position at which a portion of the current image and the common part of the preceding image are overlapped and displayed.

36. The method of claim 35, wherein, in the determining step, a matching between corresponding blocks taken from an overlapping portion of the preceding image and the current image is performed by checking intensities of individual pixels of the corresponding blocks.

37. The method of claim 35, wherein, in the determining step, both coordinates of a central pixel of a maximum-similarity common part in the preceding image and coordinates of a central pixel of the maximum-similarity common part in the current image are determined.

38. The method of claim 35, further comprising:
outputting an optical axis direction signal indicating a direction of an optical axis; and
determining a positional relation between the preceding image and the current image based on a difference between the optical axis direction signal with respect to the current image and the optical axis direction signal with respect to the preceding image.

39. The method of claim 38, wherein the storing step includes:
storing auxiliary data, which contains information indicating the positional relation from the positional relation determining step.

40. The method of claim 35, wherein, in the determining step, a displacement vector, which indicates a positional relation between the preceding image and the current image, is determined based on a difference between coordinates of a central pixel of a maximum-similarity common part in the preceding image and coordinates of a central pixel of the maximum-similarity common part in the current image, and wherein, in the displaying step, an image of the displacement vector is displayed with the current image concurrently displayed.

41. The method of claim 35, wherein the storing step includes:
storing auxiliary data, which contains information indicating the positional relation from the determining step.

42. The method of claim 35, further comprising:
displaying a displacement vector, corresponding to the positional relation between the preceding image and the current image, during movement of an optical axis.

43. The method of claim 35, wherein, in the determining step, a matching between corresponding blocks taken from an overlapping portion of the preceding image and the current image is performed, so that a maximum-similarity common part in the preceding image and the current image is identified.

44. A camera comprising:
   a display unit configured to display at least one of a current image and a preceding image taken by an optical unit;
   a storage unit configured to store the preceding image; and
   means for controlling the display unit to display a part of the preceding image when the display unit displays the current image, the displayed part of the preceding image indicating a common boundary portion between the current image and the preceding image on the displaying means at a shifted position,
   wherein the current image is taken at a position at which a portion of the current image and the displayed part of the preceding image are overlapped and displayed on the display unit.

45. The camera of claim 44, further comprising:
   means for determining a positional relation between the preceding image and the current image based on a common part in the preceding image and the current image.

46. The camera of claim 45, wherein the display unit is configured to display a displacement vector, corresponding to the positional relation between the preceding image and the current image, during movement of an optical axis of the optical unit.

47. The camera of claim 45, wherein the determining means performs a matching between corresponding blocks taken from an overlapping portion of the preceding image and the current image, so that a maximum-similarity common part in the preceding image and the current image is identified.

48. The camera of claim 45, wherein the determining means performs a matching between corresponding blocks taken from an overlapping portion of the preceding image and the current image by checking intensities of individual pixels of the corresponding blocks.

49. The camera of claim 45, wherein the determining means determines both coordinates of a central pixel of a maximum-similarity common part in the preceding image and coordinates of a central pixel of the maximum similarity common part in the current image.

50. The camera of claim 45, wherein the determining means determines a displacement vector, indicating a positional relation between the preceding image and the current image, based on a difference between coordinates of a central pixel of a maximum-similarity common part in the preceding image and coordinates of a central pixel of the maximum-similarity common part in the current image, and wherein the display unit is configured to display an image of the displacement vector with the current image concurrently displayed on the displaying means.

51. The camera of claim 45, further comprising:
   means for outputting an optical axis direction signal indicating a direction of an optical axis of the optical unit; and
   second means for determining a positional relation between the preceding image and the current image based on a difference between the optical axis direction signal output by the sensor with respect to the current image and the optical axis direction signal output by the outputting means with respect to the preceding image.

52. A camera system comprising:
   a display monitor configured to display on a screen of the display monitor at least one of a current image and a preceding image taken by an optical unit;
   a determining unit configured to display a relation between the preceding image and the current image based on a common part in the preceding image and the current image;
   a control unit configured to display a part of the preceding image on the screen when the current image is displayed on the screen, the displayed part of the preceding image indicating a positional relation between the current image and the preceding image at a shifted position,
   wherein the current image is taken by referring to the displayed part of the preceding image on the screen of the display monitor, and
   an image storing unit configured to store images taken by the optical unit in an image memory, wherein the image storing unit stores auxiliary data, which contains information indicating the positional relation from the determining unit, in the image memory, in addition to the images stored therein.

53. A camera system comprising:
   a display monitor configured to display on a screen of the display monitor at least one of a current image and a preceding image taken by an optical unit;
   a determining unit configured to determine a relation between the preceding image and the current image based on a common part in the preceding image and the current image;
   a control unit configured to display a part of the preceding image on the screen when the current image is displayed on the screen, the displayed part of the preceding image indicating a positional relation between the current image and the preceding image at a shifted position,
   wherein the current image is taken by referring to the displayed part of the preceding image on the screen of the display monitor;
   a sensor configured to output an optical axis direction signal indicating a direction of an optical axis of the optical unit;
   a secondary determining unit configured to determine a positional relation between the preceding image and the current image based on a difference between the optical axis direction signal output by the sensor with respect to the current image and the optical axis direction signal output by the sensor with respect to the preceding image; and
   an image storing unit configured to store an image of the object taken by the optical unit in an image memory, wherein the image storing unit stores auxiliary data, which contains information indicating the positional relation from the secondary determining unit, in the image memory, in addition to the image stored therein.

54. A computer program product for use with a camera system having a display monitor, an image storing unit, and an optical unit, the computer program product comprising:
   a computer storage medium; and
   a computer program code mechanism embedded in the computer storage medium for causing the camera system to display at least two images taken by said optical unit, wherein the at least two images include a preceding image and a current image, the computer program code mechanism including:

a first computer code means for causing the display monitor to display a part of the preceding image when the display monitor displays the current image, the displayed part of the preceding image indicating a positional relation between the current image and the preceding image at a shifted position, wherein the current image is taken by referring to the displayed part of the preceding image on a screen of the display monitor; and further computer code means for causing the image storing unit to store the preceding image in an image memory.

55. A method of capturing images in which a preceding image and a current image are displayed, comprising the steps of:

storing the preceding image and auxiliary data corresponding to the preceding image, wherein the auxiliary data includes a part of the preceding image;

displaying the part of the preceding image when the current image is displayed, the displayed part of the preceding image indicating a relation between the current image and the preceding image at a shifted position; and capturing the current image by referring to the displayed part of the preceding image.

56. A camera comprising:

a display unit configured to display at least one of a current image and a preceding image taken by an optical unit;

a storage unit configured to store the preceding image; and means for controlling the displaying means to display a part of the preceding image when the displaying means displays the current image, the displayed part of the preceding image indicating a positional relation between the current image and the preceding image on the displaying means at a shifted position, wherein the current image is taken by referring to the diplayed part of the preceding image on the displaying means.

* * * * *

UNITED STATES PATENT AND TRADEMARK OFFICE
CERTIFICATE OF CORRECTION

PATENT NO. : 6,798,924 B2
DATED : September 28, 2004
INVENTOR(S) : Ejiri et al.

It is certified that error appears in the above-identified patent and that said Letters Patent is hereby corrected as shown below:

<u>Title page,</u>
Item [30], Foreign Application Priority Data, should read:
-- [30]   Foreign Application Priority Data
    Sep. 10, 1997        (JP) …………………………….. 9-245522 --

Signed and Sealed this

Twenty-third Day of November, 2004

JON W. DUDAS
*Director of the United States Patent and Trademark Office*